United States Patent

Maberry et al.

Patent Number: 5,457,867
Date of Patent: Oct. 17, 1995

[54] SYSTEM FOR ASSEMBLING FURNITURE

[75] Inventors: Shawn A. Maberry, Lamar, Mo.;
Lester J. Moriconi, North Little Rock, Ark.

[73] Assignee: O'Sullivan Industries, Inc., Lamar, Mo.

[21] Appl. No.: 207,763

[22] Filed: Mar. 8, 1994

[51] Int. Cl.⁶ .................................................. B23P 19/02
[52] U.S. Cl. .................. 29/525; 29/525.1; 312/334.19; 312/350
[58] Field of Search ...................... 29/525, 525.1; 312/334.1, 334.7, 334.18, 334.19, 334.21, 334.22, 348.1, 348.2, 350

[56] References Cited

U.S. PATENT DOCUMENTS

| 3,610,719 | 10/1971 | Alston | 312/348.1 |
| 4,786,123 | 11/1988 | Rock et al. | 312/334.21 |
| 5,090,787 | 2/1992 | Harley | 312/334.7 |

FOREIGN PATENT DOCUMENTS

| 2671000 | 7/1992 | France | 312/350 |
| 2251238 | 5/1974 | Germany | 312/350 |
| 2358166 | 5/1975 | Germany | 312/350 |
| 3038832 | 5/1982 | Germany | 312/334.19 |
| 1600137 | 10/1981 | United Kingdom | 312/348.2 |

Primary Examiner—David P. Bryant
Attorney, Agent, or Firm—Haynes and Boone

[57] ABSTRACT

A system that allows for easy assembly of ready-to-assemble ("RTA") furniture without using any tools or other supplemental hardware is disclosed. A drawer slide support is provided with substantially cylindrically shaped, ribbed bushings connected to the support. The support includes a sliding portion mounted to a first member of a piece of furniture, such as a drawer or shelf. A second member of furniture, such as an upright panel, is provided with openings into which the bushings may be easily press-fitted, but not easily removed. The support may thus be attached with the bushings to the second member of furniture so that the first and second members of furniture are assembled together without using tools, supplemental hardware, or excessive force.

1 Claim, 2 Drawing Sheets

SYSTEM FOR ASSEMBLING FURNITURE

TECHNICAL FIELD

The present invention relates generally to ready-to-assemble ("RTA") furniture, and more particularly to a system for attaching an article, such as a sliding drawer or shelf, to a piece of furniture without using any tools or supplemental hardware.

BACKGROUND OF THE INVENTION

The design and manufacture of ready-to-assemble ("RTA") furniture has been a steadily growing field. RTA furniture is typically shipped in a disassembled state to the ultimate consumer, who then assembles the various components to obtain a finished product. RTA furniture of the cabinet type, normally will include a number of vertical and horizontal panels designed to be joined together. The vertical, or upright, panels define spaces which may receive, for example, fixed or movable drawers or shelves. Movable drawers and shelves are provided with drawer slides, which typically comprise two interlocking, complementary members; the first of which is a drawer member affixed to the bottom edge of a drawer or shelf, and the second of which is a cabinet member affixed to an upright panel of the furniture. The two members of the drawer slide are designed to interlock in such a fashion that the drawer or shelf is firmly supported in a chosen position and slides easily in and out on rollers or similar mechanisms.

Conventional design allows for the drawer member of a drawer slide to be assembled with the drawer without tools or supplemental hardware. Generally, such drawer members have a lower lip that a drawer or shelf may rest on and prongs to secure the drawer or shelf to the lip. This assembly technique, though, is not available for the cabinet member of a drawer slide. Conventional cabinet members require screws or nails, together with appropriate tools, to attach a cabinet member to a cabinet upright panel. This is a drawback because it is the only aspect of assembling such RTA furniture that requires any tools or supplemental hardware, and, as a result, is a major reason that many potential consumers of RTA furniture shy away from purchasing RTA furniture.

Another disadvantage associated with conventional RTA furniture hardware is that good quality control is required to ensure that each piece of additional hardware is packaged with the furniture and that the packaging is adequate for the hardware. Furthermore, there exists the potential that a consumer will not assemble a piece of hardware with the same degree of skill and care as would the manufacturer. For example, screws may be put in crooked or not sufficiently tightened, or tightened too much resulting in stripped threads either in the screw or panel material, which may be wood or particle board. If glue is required, a consumer may use incorrect quantities, or not allow the correct amount of dry time. These and other drawbacks can result in a piece of furniture that is not only not as strong or as durable as it could be, but also one that is less aesthetically appealing. When there are moving parts involved, such as sliding drawers and shelves discussed herein, strength and durability are particularly important considerations when making a purchase of furniture.

For the foregoing reasons, there is a need for RTA furniture that is durable yet easy to assemble without using any tools or other supplemental hardware.

SUMMARY OF THE INVENTION

The foregoing problems are solved and a technical advance is achieved by a system that allows for easy assembly of ready-to-assemble ("RTA") furniture without using any tools or other supplemental hardware. In a departure from the art, special bushings are attached to the cabinet member of a drawer slide. The bushings are provided with resilient ribs that encircle the bushings. The ribs are shaped like conical frustrums, i.e., solid portions of cones formed when the tops of the cones are cut off by a plane. Openings are also provided in the upright furniture panels corresponding to the bushings attached to the cabinet members. The ribs are arranged so that the bushings may be easily press-fitted into the openings. Because of the shape of the ribs, though, the bushings may not be easily removed, and become so well attached to the panel that the drawer member and the associated drawer or shelf supported by the bushings are able to sustain very heavy loads.

In a preferred embodiment of the invention, the system comprises a support and one or more substantially cylindrically shaped, ribbed bushings connected to the support. The support is mounted to a first member of a piece of furniture, such as a drawer or shelf. A second member of furniture, such as an upright panel, is provided with openings into which the bushings may be easily press-fitted, but not easily removed. The support may thus be attached to the second member of furniture so that the first and second members of furniture are assembled together.

To facilitate connecting the bushings to the support, each bushing is provided with a threaded bore and the support is provided with holes at points where the bushings are to be attached. A screw is inserted through the hole and threaded into the bore, thus connecting the bushing to the support.

The support includes two members slidably engaged with each other, one member connected by the foregoing bushing assembly to the furniture panel and the other to the drawer or shelf. Two supports are used, one on each side of the drawer or shelf, so that the drawer or shelf may slide in and out of the furniture.

An advantage achieved with the invention is that, using the assembly system, RTA furniture can be assembled entirely by hand without the use of tools or supplemental hardware.

A further advantage achieved is that the quality and strength of the furniture is improved because assembly is performed more easily and consistently by the consumer.

DESCRIPTION OF A PREFERRED EMBODIMENT

Figure 1:
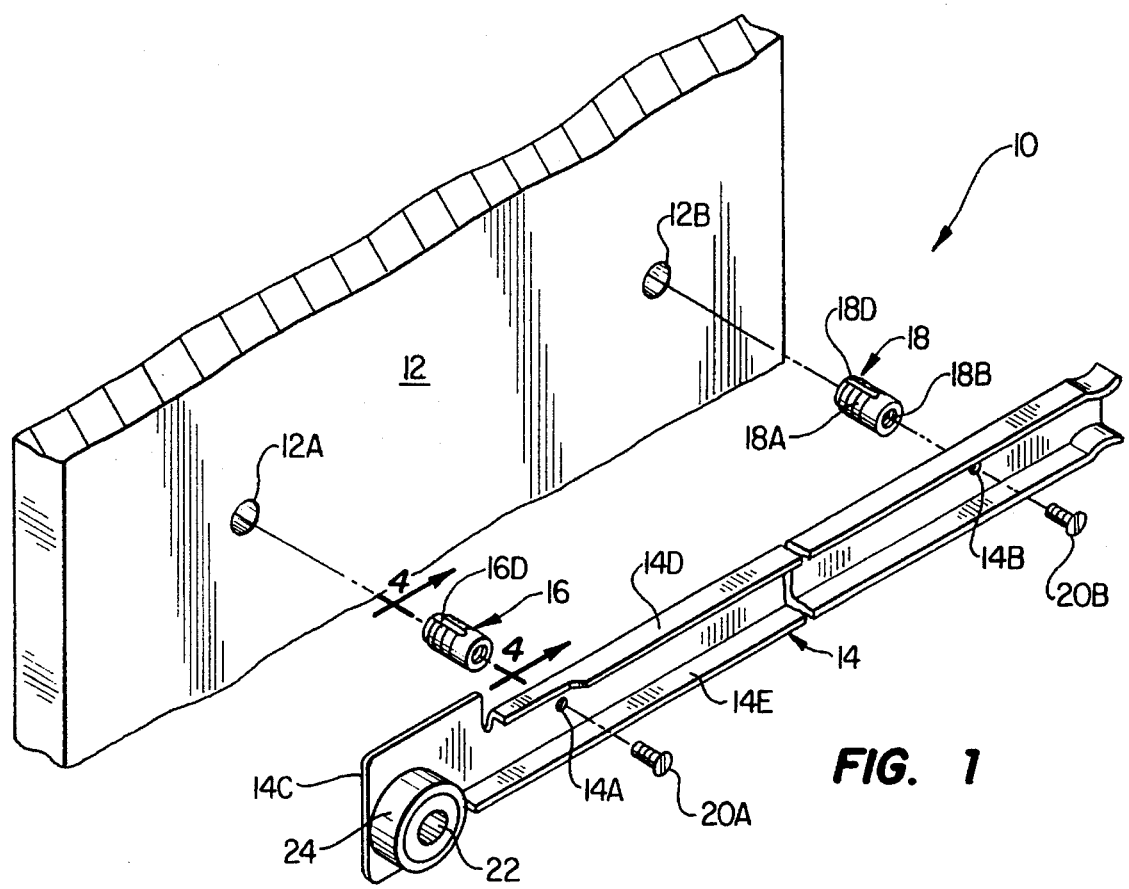
FIG. 1 is an exploded view of the system of the present invention for assembling furniture.
Figure 2:
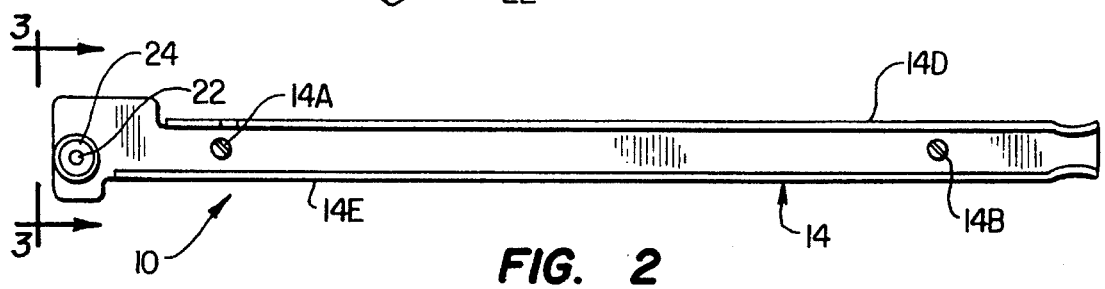
FIG. 2 is a right-side elevational view of the cabinet member of the drawer slide shown in FIG. 1.

In FIGS. 1 and 2, the reference numeral 10 designates a ready-to-assemble ("RTA") furniture assembly which includes an upright cabinet panel 12, a cabinet member 14 of a drawer slide, two substantially identical bushings 16 and 18, and two screws 20A and 20B. While not shown in FIG. 1, but as will be described with reference to FIG. 5, the cabinet member 14 slidably engages with a drawer member of a drawer slide, the drawer member being attached to a drawer or a shelf of a piece of furniture.

As exemplified herein, the upright cabinet panel 12 has a planar surface, may be made of wood or particle board, and is provided with two spaced-apart openings 12A and 12B. The cabinet member 14 comprises spaced-apart holes 14A and 14B extending through a planar surface 14C, and upper and lower lips 14D and 14E, respectively. A support pin 22 supports a roller 24 at one end of the cabinet member 14. The openings 12A and 12B and the holes 14A and 14B are spaced apart an equal amount for their proper alignment relative to one another.

Figure 3:
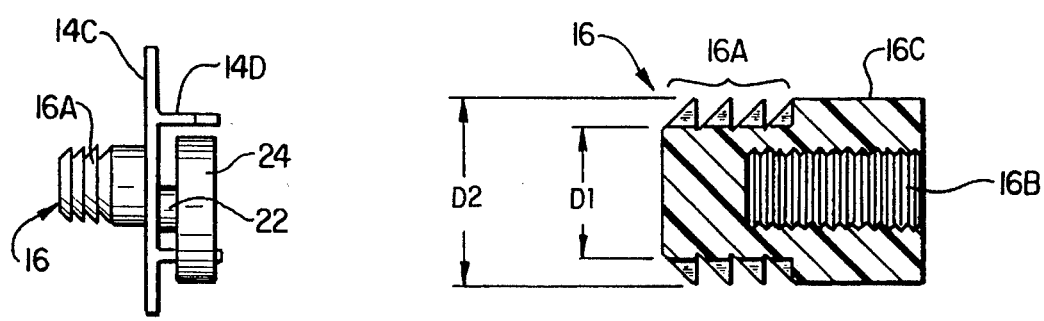
FIG. 3 is an enlarged front elevational view of the cabinet member of the drawer slide shown in FIG. 1.
Figure 4:
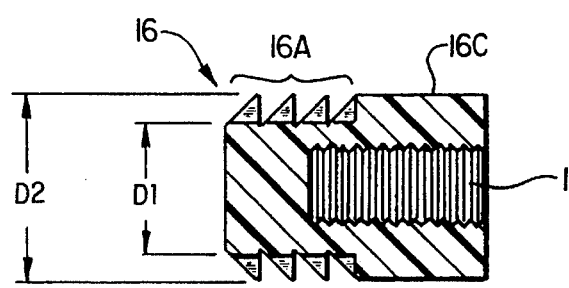
FIG. 4 is an enlarged cross-sectional view of the bushing shown in FIG. 1 with provision for receiving a screw for attachment to the cabinet member of the drawer slide; and, FIG. 5 is a perspective view of a typical piece of RTA furniture illustrating the system of FIG. 1 for both a movable drawer and a movable shelf.

As more clearly seen in FIGS. 3 and 4, the bushing 16 includes a plurality of ribs 16A at one end thereof. A threaded bore 16B is defined in the other end of the bushing 16, for receiving the screw 20A. The diameter of the hole 14A of the cabinet member 14 (FIG. 1) is sized so that the threaded portion of the screw 20A may extend therethrough into the threaded bore 16B. The bushing 16 is constructed of a resilient material, such as injection-molded nylon, and is sized to be press-fitted into the openings 12A and 12B. Each of the bushing ribs 16A is defined geometrically by a conical frustrum with an angled surface and a flat surface, wherein the angled surface is oriented 45 degrees, for example, relative to the longitudinal axis of the bushing, and the flat surface is oriented perpendicular to the longitudinal axis of the bushing. The ribs 16A have a minor diameter D1 of, for example, 10 millimeters, and a major diameter D2 of, for example, 10.8 millimeters. The ratio of the minor diameter D1 to that of the major diameter is optimized to permit the ribs 16A to be easily inserted into the opening 12A, but not easily removed, as described below. A smooth, cylindrically shaped surface 16C defines the end of the bushing 16 opposite to the ribs 16A.

It is understood that the bushing 18 (FIG. 1) is constructed in the same manner as the bushing 16, just described. The bushing 18 is connected to the member 14 by the screw 20B, which extends into a bore 18B of the bushing 18.

Referring again to FIG. 1, the bushings 16 and 18 are provided with notches 16D and 18D, respectively, that extend from the end of each bushing through one or more of the respective ribs 16A, 18A, parallel to the longitudinal axes of the bushings.

In assembly, the screws 20A, 20B extend through the holes 14A, 14B of the member 14 and threadingly engage the bores 16B, 18B of the bushings 16, 18, respectively, until the bushings are secured flush against and substantially perpendicular to the surface 14C of the member 14. The notches 16D and 18D are used to restrain the respective bushings 16 and 18 from rotation while the screws 20A and 20B are tightened. Preferably, the bushings 16 and 18 are attached in this fashion to the member 14 at the furniture factory prior to delivery to the consumer.

The cabinet member 14 is then firmly attached to the upright cabinet panel 12 by aligning the ends of the bushings 16 and 18 with the respective openings 12A and 12B of the panel, and pressing the cabinet member 14 so that the bushings 16 and 18 are press-fitted into the openings 12A and 12B, until the surface 14C of cabinet member 14 is urged flush against the panel 12. This may be done by the consumer without using any tools. Due to the resiliency and shape of the ribs 16A and 18A of bushings 16 and 18, the bushings are easily inserted into, but not removed from, the openings 12A and 12B, thereby enabling the cabinet member 14 to support loads from drawers and shelves. The size of the bushings 16 and 18 relative to the size of the openings 12A and 12B, along with the ratio of the minor diameter D1 to the major diameter D2 of the ribs 16 and 18, are carefully chosen to ensure both ease of assembly without tools, and the adequate connection of the member 14 to the panel 12.

Figure 5:
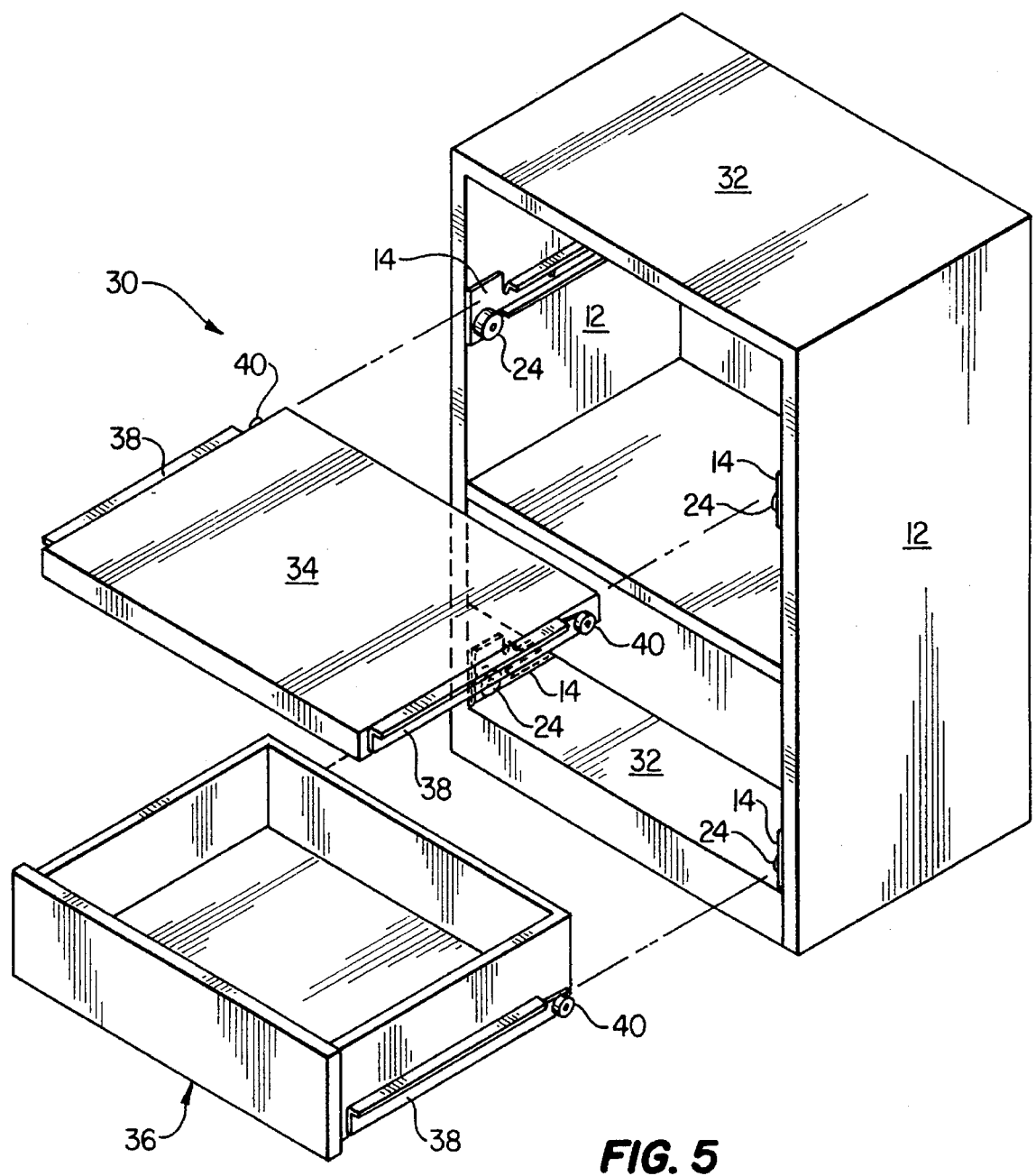

FIG. 5 illustrates the furniture assembly 10 for a piece of RTA furniture 30. The furniture 30 comprises a pair of the upright cabinet panels 12 and horizontal top and bottom panels 32, assembled together to form a substantially rigid box-like structure defining a space into which a sliding shelf 34 and a sliding drawer 36 may be received. The sliding shelf 34 and sliding drawer 36 are installed between the cabinet panels 12 using drawer slides comprising drawer members 38 and cabinet members 14. The support rollers 24 attached to the cabinet members 14 and rollers 40 attached to the drawer members 38 enable the cabinet and support members to engage each other and slide easily relative to one another, guided by the upper and lower lips 14D and 14E of the cabinet member.

While disassembly of RTA furniture is, by design, not as easy as assembly, disassembly may also be performed. To remove a cabinet member 14 from a cabinet panel 12, the screws 20A and 20B may be removed using a screwdriver, allowing the cabinet member 14 to be removed. The bushings 16 and 18 remain in the openings 12A and 12B. The cabinet member 14 may be reassembled to the panel 12 by using a screwdriver to re-insert the screws 20A and 20B through the holes 14A and 14B into the bores 16C and 18C.

The embodiment of the present invention as described herein has many advantages over the prior art, including ease of assembly. As discussed above, drawer members 38 require no tools or supplemental hardware to assemble. Using the embodiment described herein, a manufacturer may pre-drill the openings 12A and 12B and attach the bushings 16 and 18 to the cabinet members 14. This would enable a consumer to completely assemble the remaining pieces of RTA furniture without using any tools or supplemental hardware.

Another advantage includes improved quality of RTA furniture because all hardware assembly can be performed by the manufacturer, thus obviating a major source of potential consumer assembly problems and frustrations. As discussed above, this advantage can result in furniture that is not only more aesthetically appealing, but also furniture that is stronger and more durable. With less hardware for a consumer to assemble, there are also fewer pieces of hardware for a manufacturer to package or to inadvertently leave out of a package. Similarly, there is less hardware for a consumer to lose.

Although the present invention has been described in considerable detail with reference to a preferred embodiment thereof, other embodiments are possible. For example, any number of ribs of differing dimensions could be used, depending on the size and type of openings in which the bushings are to be received. The number of bushings used may vary, and they may be used in cooperation with both members or just one member of the slide. The bushings may be constructed of materials of differing resiliency or strength. Both the bushings and the members to which the bushings are to be attached may be constructed of a like material, such as plastic, and integrally molded together, thereby obviating the need for a fastener to connect them together. The bushings may be incorporated into assemblies with only one member and no sliding capability, or alternatively, may be incorporated into assemblies with more than two members, such as full extension slides. Therefore, the spirit and scope of the appended claims should not be limited to the description of the preferred embodiment contained herein.

What is claimed is:

1. A method for assembling first and second members of a piece of furniture, said method comprising the steps of:

providing a support having a sliding portion and a fixed portion, said sliding portion connected to said first furniture member and said fixed portion for sliding engagement with said sliding portion;

connecting at least two cylindrically shaped bushings, each having an internal threaded bore, to said fixed portion of said support, each of said bushings connected by a respective threaded fastener extending through a respective opening in said fixed portion of said support into the internal threaded bore of the bushing;

defining in said second furniture member at least two openings for receiving said at least two bushings;

mounting said fixed portion of said support to said second furniture member by press-fitting, without using tools or supplemental hardware, said at least two bushings into said at least two openings so that said at least two bushings cannot be easily removed therefrom; and slidably engaging said sliding portion and said fixed portion so that said first and second furniture members are assembled in a predetermined sliding relationship;

wherein after said at least two bushings are press-fit into said at least two openings, said fixed portion of said support is detachable from said second furniture member by removal of said threaded fasteners from said threaded bores.

* * * * *